US012257858B2

(12) United States Patent
Komuro

(10) Patent No.: US 12,257,858 B2
(45) Date of Patent: Mar. 25, 2025

(54) PRINTED MATERIAL MANAGEMENT SYSTEM THAT PROVIDES A PRINTED MATERIAL IDENTIFIER USING INVISIBLE INK

(71) Applicant: SEIKO EPSON CORPORATION, Tokyo (JP)

(72) Inventor: Shintaro Komuro, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/323,679

(22) Filed: May 25, 2023

(65) Prior Publication Data

US 2023/0382148 A1 Nov. 30, 2023

(30) Foreign Application Priority Data

May 27, 2022 (JP) ................................ 2022-087070

(51) Int. Cl.

| | |
|---|---|
| ***B42D 25/378*** | (2014.01) |
| ***B41J 2/21*** | (2006.01) |
| ***B41J 11/00*** | (2006.01) |
| ***B41J 29/18*** | (2006.01) |
| ***B42D 25/48*** | (2014.01) |

(52) U.S. Cl.
CPC ........... *B42D 25/378* (2014.10); *B41J 2/2114* (2013.01); *B41J 11/00218* (2021.01); *B41J 11/0095* (2013.01); *B41J 29/18* (2013.01); *B42D 25/48* (2014.10)

(58) Field of Classification Search
USPC ........................................................ 358/3.28
See application file for complete search history.

(56) References Cited

U.S. PATENT DOCUMENTS

2020/0079097 A1* 3/2020 Otsuka ................. H04N 1/4413
2023/0158796 A1* 5/2023 Yamazaki ............ B41J 2/04556
347/8

FOREIGN PATENT DOCUMENTS

JP 2006-093921 A 4/2006

* cited by examiner

*Primary Examiner* — Jacky X Zheng
(74) *Attorney, Agent, or Firm* — WORKMAN NYDEGGER

(57) ABSTRACT

A printing device includes a providing unit configured to provide to a printed material an identifier for managing the printed material. The providing unit prints the identifier with invisible ink on the printed material. The identifier is visually recognizable under special light and invisible under normal light.

10 Claims, 6 Drawing Sheets

PRINTED MATERIAL MANAGEMENT SYSTEM THAT PROVIDES A PRINTED MATERIAL IDENTIFIER USING INVISIBLE INK

The present application is based on, and claims priority from JP Application Serial Number 2022-087070, filed May 27, 2022, the disclosure of which is hereby incorporated by reference herein in its entirety.

BACKGROUND

1. Technical Field

The present disclosure relates to a printing device and a printed material management system.

2. Related Art

As disclosed in JP-A-2006-93921, for example, there is a document management system, which is an example of a printed material management system for managing a printed material printed using a digital multifunctional device, which is an example of a printing device. The document management system manages printed materials by printing on a sheet an identification mark, which is an example of an identifier, and reading the identification mark of a printed material to be discarded.

The digital multifunctional device disclosed in JP-A-2006-93921 prints on a sheet a text and an identification mark in a combined manner. Specifically, the identification mark is printed with the same toner as that of the text. As such, the appearance of the printed material is degraded due to the identification mark.

SUMMARY

A printing device for solving the above-described problems includes a providing unit configured to provide to a printed material an identifier for managing the printed material. The providing unit prints the identifier with invisible ink on the printed material, and the identifier is visually recognizable under special light and invisible under normal light.

A printed material management system for solving the above-described problems includes the above-described printing device, and a destroying device. The destroying device includes an irradiation unit configured to emit the special light, an identification unit configured to read the identifier irradiated with the special light from the irradiation unit, a detection unit configured to detect a deficiency of the printed material, and a breaking unit configured to break down the printed material.

A printed material management system for solving the above-described problems includes the above-described printing device, and a copying device. The copying device includes an irradiation unit configured to emit the special light, an identification unit configured to read the identifier irradiated with the special light from the irradiation unit, an image reading unit configured to read an image of the printed material, a copying unit configured to produce a copied material, and a restricting unit configured to restrict reading of the image or production of the copied material. The restricting unit restricts the reading of the image or the production of the copied material for the printed material provided with the identifier.

A printed material management system for solving the above-described problems includes the above-described printing device, and a copying device. The copying device includes an irradiation unit configured to emit the special light, an identification unit configured to read the identifier irradiated with the special light from the irradiation unit, an image reading unit configured to read an image of the printed material, and a copying unit configured to produce a copied material. The copying unit prints the image and the identifier with visible ink, and the image and the identifier printed by the copying unit are visually recognizable under normal light.

A printed material management system for solving the above-described problems includes the above-described printing device, and a copying device. The copying device includes an irradiation unit configured to emit the special light, an identification unit configured to read the identifier irradiated with the special light from the irradiation unit, an image reading unit configured to read an image of the printed material, and a copying unit configured to produce a copied material. The copying unit prints with visible ink the image of the printed material provided with the identifier and a symbol indicating that the material is the copied material to produce the copied material including the image and the symbol that are visually recognizable under normal light.

DESCRIPTION OF EXEMPLARY EMBODIMENTS

First Embodiment

Printing System

A printing device and a printed material management system including the printing device according to a first embodiment are described below with reference to the accompanying drawings.

Figure 1:
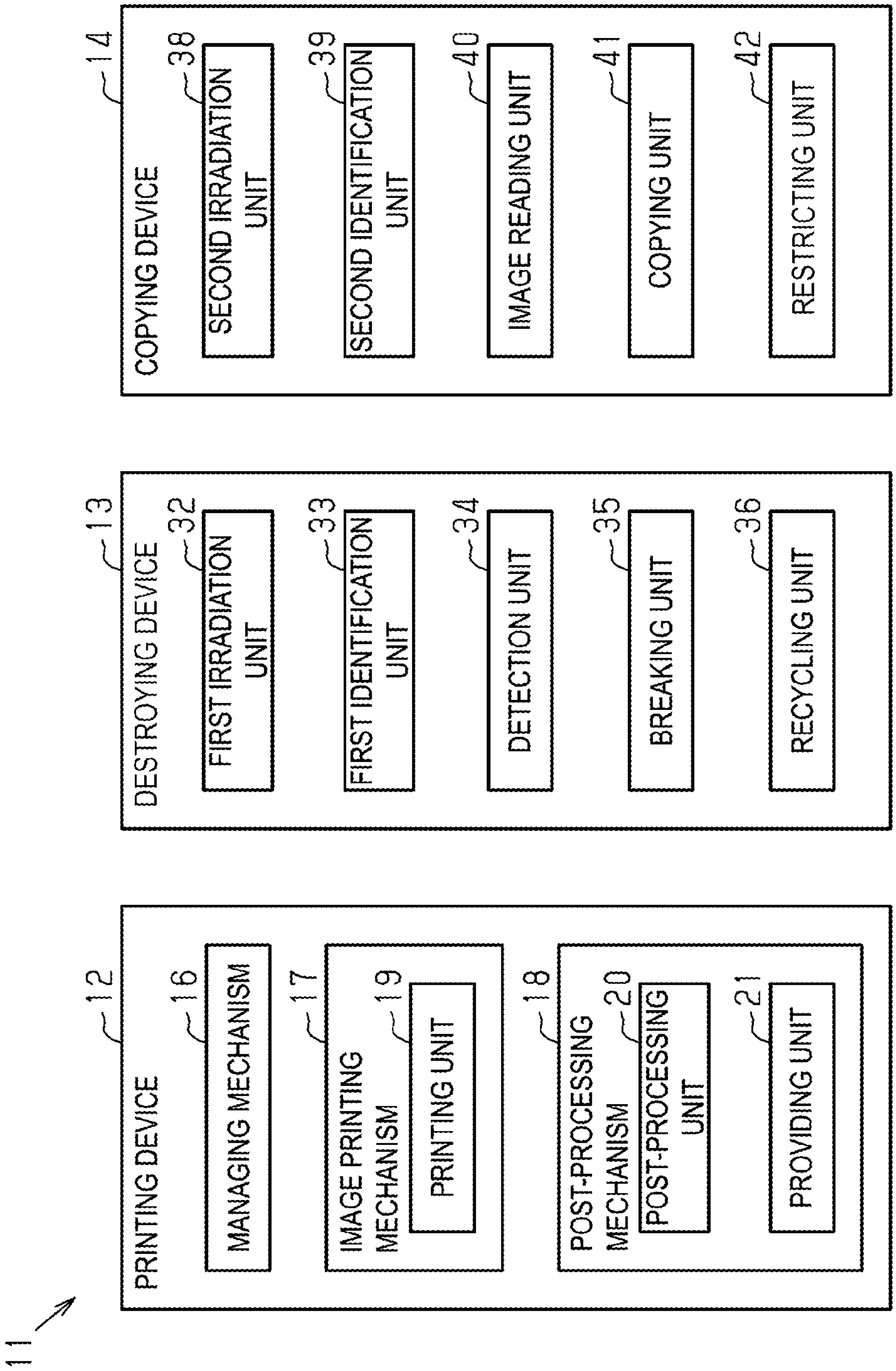
FIG. 1 is a block diagram illustrating a printed material management system according to a first embodiment.

As illustrated in FIG. 1, a printed material management system 11 may include a printing device 12, a destroying device 13, and a copying device 14. The printed material management system 11 may be implemented with a device owned by one user, or devices owned by a plurality of respective users. For example, the printed material management system 11 may include the printing device 12 owned by a first user, the destroying device 13 owned by a second user, and the copying device 14 owned by a third user.

The printing device 12, the destroying device 13, and the copying device 14 may be connected to each other in a wired or wireless manner to enable the transmission of information. The printing device 12, the destroying device 13, and the copying device 14 may be connected to each other through a server, and may exchange information through a storage medium that can store information.

The printing device 12, the discarding device 13, and the copying device 14 may be connected to each other in a wired or wireless manner to enable the transmission of information. The printing device 12, the discarding device 13, and the copying device 14 may be connected to each other through a server, and may exchange information through a storage medium that can store information.

Printing Device

The printing device 12 may include a managing mechanism 16, an image printing mechanism 17, and a post-processing mechanism 18. The managing mechanism 16, the image printing mechanism 17, and the post-processing mechanism 18 may be configured such that at least two of them are integrated with each other, or that they are separate members. The image printing mechanism 17 may include a printing unit 19. The post-processing mechanism 18 may include a post-processing unit 20 and a providing unit 21. That is, the printing device 12 includes the providing unit 21. The printing device 12 produces a printed material 22 illustrated in FIG. 2.

The managing mechanism 16 is a personal computer, for example. The managing mechanism 16 may manage the printed material 22. The managing mechanism 16 may manage the existing printed material 22 based on information about the printed material 22 produced at the printing device 12 and the printed material 22 discarded by the destroying device 13.

Figure 2:
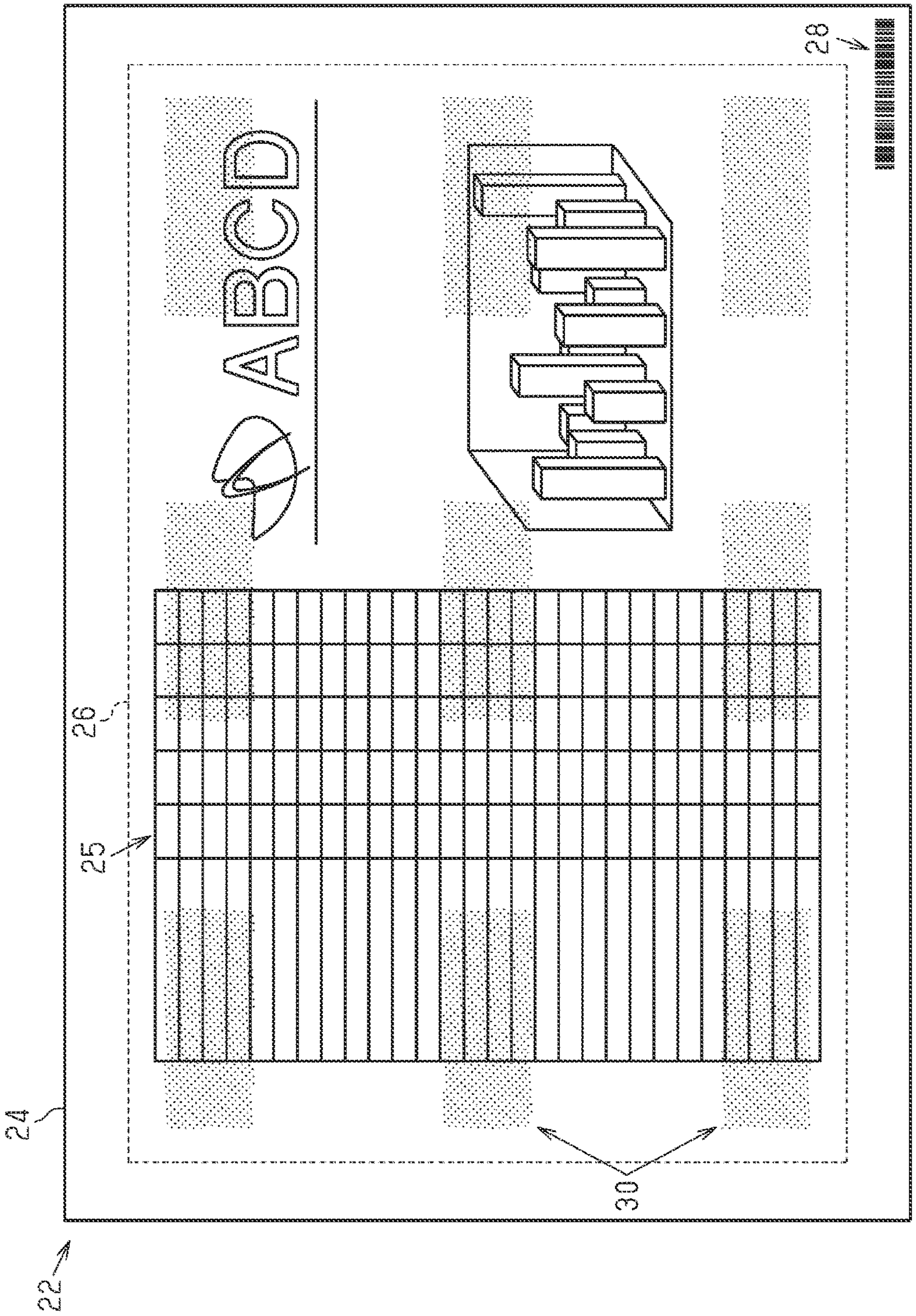
FIG. 2 is a schematic diagram of a printed material produced by the printed material management system.

As illustrated in FIGS. 1 and 2, the printing unit 19 produces the printed material 22 by printing an image 25 on a sheet 24. The printing unit 19 may print the image 25 in a printing region 26 indicated with the broken line in FIG. 2. The image 25 may include a table, a logo, a graph, a character, a number, a photograph, a picture, a symbol, a mark, a pattern, or a combination thereof.

The image printing mechanism 17 of this embodiment is an ink-jet printer that performs printing by jetting ink by the printing unit 19. The image printing mechanism 17 may be a laser printer, a thermal printer, a dot impact printer, a digital printer, a textile printing printer, or a screen printer.

The printing unit 19 may print a visible reference symbol 28 on the sheet 24. The printing unit 19 may print the visible reference symbol 28 in a margin outside the printing region 26, for example. The printing unit 19 may print the visible reference symbol 28 on the sheet 24 on which the image is printed, print the visible reference symbol 28 before the image 25, or print the image 25 and the visible reference symbol 28 together.

The post-processing unit 20 performs a post-processing on the printed material 22. The post-processing may include a stapling process, a punching process, and a shifting process, for example. The stapling process is a process of binding a plurality of the printed materials 22 with a stapler. The punching process is a process of making a hole in one or more printed materials 22. The shifting process is a process of ejecting the printed material 22 while shifting the position for each set.

The providing unit 21 provides an identifier 30 for managing the printed material 22 to the printed material 22. The providing unit 21 provides the identifier 30 including information different for each printed material 22. The providing unit 21 may provide the identifier 30 before the post-processing is performed on the printed material 22 on which the image 25 is printed. The providing unit 21 may provide the identifier 30 in the printing region 26, for example. The providing unit 21 may provide the identifier 30 in an overlapping manner on the image 25.

The providing unit 21 may provide a plurality of the identifiers 30 to one printed material 22. The providing unit 21 may provide the identifier 30 in each section of the vertically and horizontally sectioned sheet 24, for example. The plurality of identifiers 30 may be identical to each other, or may include respective different information. The providing unit 21 may provide the identifier 30 to some printed materials 22 among the printed materials 22 produced by the printing unit 19. The user may designate the printed material 22 to which the identifier 30 is provided.

Identifier and Visible Reference Symbol

As illustrated in FIG. 2, the identifier 30 may include a one-dimensional code, a two-dimensional code, a character, a mark, or a number, for example. The identifier 30 is visually recognizable under special light and invisible under normal light. That is, the identifier 30 appears transparent under normal light. The term "invisible" means a state where it is difficult for a person to recognize the identifier 30 with the naked eye. Under normal light, a person is more likely to recognize the image 25 below identifier 30 than the identifier 30.

The providing unit 21 prints the identifier 30 with invisible ink on the printed material 22. The invisible ink may be retroreflection ink with a retroreflection function. The identifier 30 provided using the retroreflection ink reflects light as it is toward the light source. When the identifier 30 is irradiated with directional light such as flash, the identifier 30 reflects the light to the direction of the light source. Therefore, when irradiated with a flash of light, which is an example of the special light, the identifier 30 is identifiable.

The normal light is visible light other than special light. The special light and normal light depend on the type of the invisible ink used for printing the identifier 30. Specifically, when the identifier 30 is provided using the retroreflection ink, the directional light is special light, and diffused light is normal light. For example, the normal light may be artificial light emitted from a light source such as a fluorescent lamp, an electric light bulb, and an LED, or natural light such as sunlight.

The printing unit 19 prints the image 25 and the visible reference symbol 28 with visible ink. The image 25 and the visible reference symbol 28 printed with visible ink absorb or reflect normal light. Therefore, the image 25 and the visible reference symbol 28 are visually recognizable under normal light. The one printed with the visible ink is visually recognizable under normal light. Examples of the visible ink include black ink that absorbs normal light. Examples of the visible ink include cyan ink, magenta ink, and yellow ink that reflect a part of normal light.

The visible reference symbol 28 may include information about the printed material 22. The visible reference symbol 28 may be a one-dimensional code, a two-dimensional code, a character, a mark, or a number, for example. The visible reference symbol 28 may be a color code obtained by coloring a one-dimensional or two-dimensional code.

The information about the printed material 22 may include the shape of the printed material 22, the size of the printed material 22, the presence or absence of the identifier 30, the number of the identifiers 30, the date when the printed material 22 is produced, the person who produced the printed material 22, and the deadline of discarding, for example. The printing unit 19 may print a plurality of the visible reference symbols 28 on one sheet 24. The plurality of visible reference symbols 28 may include the same information, or respective different information.

Destroying Device

As illustrated in FIG. 1, the destroying device 13 may include a first irradiation unit 32, which is an example of the irradiation unit, a first identification unit 33, which is an example of the identification unit, a detection unit 34, a breaking unit 35, and a recycling unit 36. The destroying device 13 may be a dry papermaking machine.

The first irradiation unit 32 emits special light. A second identification unit 39 reads the identifier 30 irradiated with special light.

The detection unit 34 detects a deficiency of the printed material 22. The detection unit 34 may detect a deficiency of the printed material 22 based on the shape of an end of the printed material 22. For example, the detection unit 34 detects a deficiency when the printed material 22 does not have a rectangular shape, a straight side, or a right-angled corner. The detection unit 34 may detect a deficiency of the printed material 22 by acquiring, from the printing device 12, information about the printed material 22 at the time of production, and comparing it with the current printed material 22, for example. The information about the printed material 22 to be acquired may include at least one of the size, shape, number of sides, length of sides, number of corners, angle of corners of the printed material 22, or the like.

The breaking unit 35 breaks down the printed material 22. The breaking unit 35 may break down the printed material 22 into fibers.

The recycling unit 36 may recycle the broken printed material 22 into the sheet 24. More specifically, the recycling unit 36 may produce the sheet 24 by binding and shaping the fibers broken down by the breaking unit 35.

Copying Device

As illustrated in FIG. 1, the copying device 14 may include a second irradiation unit 38, which is an example of the irradiation unit, the second identification unit 39, which is an example of the identification unit, an image reading unit 40, a copying unit 41, and a restricting unit 42. In addition, as examples, the printing unit 19 is composed of a recording head, and the image reading unit 40 is composed of a CIS or a CCD.

The second irradiation unit 38 emits special light. A second identification unit 39 reads the identifier 30 irradiated with special light. The image reading unit 40 reads the image 25 of the printed material 22. The image reading unit 40 may read the image 25 while applying normal light to the image 25.

The copying unit 41 of this embodiment copies the printed material 22 provided with no identifier 30. The copying unit 41 produces a copied material not illustrated in the drawing. The copying unit 41 may print, on another the sheet 24, the visible reference symbol 28 and the image 25 of the printed material 22 read by the image reading unit 40.

The restricting unit 42 may restrict the reading of the image 25 or the production of copied materials for the printed material 22 provided with the identifier 30. For example, when the second identification unit 39 reads the identifier 30 before the image reading unit 40 reads the image the restricting unit 42 may restrict the reading of the image 25 of the printed material 22 provided with the identifier 30. For example, when the second identification unit 39 reads the identifier 30 together with or after the reading of the image 25 by the image reading unit 40, the restricting unit 42 may restrict the copying of the printed material 22 provided with the identifier 30.

Operations of First Embodiment

Operations of this embodiment are described below.

The destroying device 13 may check the presence or absence of the identifier 30 before the printed material 22 is discarded. When the printed material 22 to be discarded is not provided with the identifier 30, the destroying device 13 may discard the printed material 22 as it is. When the printed material 22 to be discarded is provided with the identifier 30, the destroying device 13 may send information about the printed material 22 to be discarded to the managing mechanism 16.

The copying device 14 may check the presence or absence of the identifier 30 before copying the printed material 22. When the original printed material 22 is not provided with the identifier 30, the copying device 14 copies the printed material 22. When the original printed material 22 is provided with the identifier 30, the copying device 14 restricts the reading or copying of the image 25. That is, the printed material 22 provided with the identifier 30 is not copied.

The managing mechanism 16 may manage the printed material 22 provided with the identifier 30. The managing mechanism 16 may exclude, from the printed material 22 to be managed, the printed material 22 discarded by the destroying device 13. The managing mechanism 16 may manage the printed material 22 from the time it is produced until it is discarded.

Effects of First Embodiment

Effects of this embodiment are described below.

(1) The identifier 30 is provided to the printed material 22 by using invisible ink. The identifier 30 is visually recognizable under special light and invisible under normal light. Thus, the degradation in appearance of the printed material 22 due to the identifier 30 can be reduced.

(2) The providing unit 21 provides the plurality of identifiers 30 to the printed material 22. Thus, even when the printed material 22 is torn and some of the identifiers 30 become unidentifiable, the printed material 22 can be identified with other identifiers 30, for example.

(3) The destroying device 13 can identify the printed material 22 with the first irradiation unit 32 emitting special light to the printed material 22 and the first identification unit 33 reading the identifier 30 provided to the printed material 22. The destroying device 13 includes the detection unit 34 that detects a deficiency of the printed material 22. Thus, the printed material management system 11 can manage whether the printed material 22 is thoroughly discarded.

(4) The detection unit 34 detects the deficiency based on the shape of the printed material 22, and thus can detect the deficiency even when the deficiency is small.

(5) The copying device 14 can identify the printed material 22 with the second irradiation unit 38 emitting special light to the printed material 22 and the second identification unit 39 reading the identifier 30 provided to the printed material 22. The restricting unit 42 restricts the reading of the image 25 or the production of the copied material 44 for the printed material 22 provided with the identifier 30. Specifically, the printed material 22 provided with the identifier 30 is not duplicated, and thus the printed material 22 can be easily managed.

(6) If the identifier 30 is printed before the image 25, the identifier 30 may possibly be hidden by the image 25. In view of this point, the providing unit 21 is provided in the post-processing mechanism 18. The post-processing mechanism 18 performs the post-processing on the printed material 22 produced by the image printing mechanism 17. Thus, the providing unit 21 can print the identifier 30 on the printed material 22 on which the printing has been performed.

(7) The destroying device 13 causes the recycling unit 36 to recycle, into the sheet 24, the printed material 22 broken by the crushing unit 35. Thus, the resources can be effectively utilized.

(8) In addition to the transparent identifier 30, the visible reference symbol 28 is printed with the visible ink on the printed material 22. Specifically, information is provided to the printed material 22 in such a manner that the transparent identifier 30 and the visible reference symbol 28 that is visually recognizable are separately provided. Thus, the information to be kept secret from a person and the information to be recognized by a person can be separately provided to the printed material 22.

(9) For example, when the identifier 30 is printed with visible ink, it is necessary to process the image 25 in order to secure the space for printing the identifier 30, for example. In view of this point, the providing unit 21 prints the identifier 30 with invisible ink. Specifically, the identifier 30 can be printed in an overlapping manner on the image 25, and thus the identifier 30 can be easily provided.

Second Embodiment

Next, a printing device and a printed material management system of a second embodiment are described with reference to the drawings.

Figure 3:
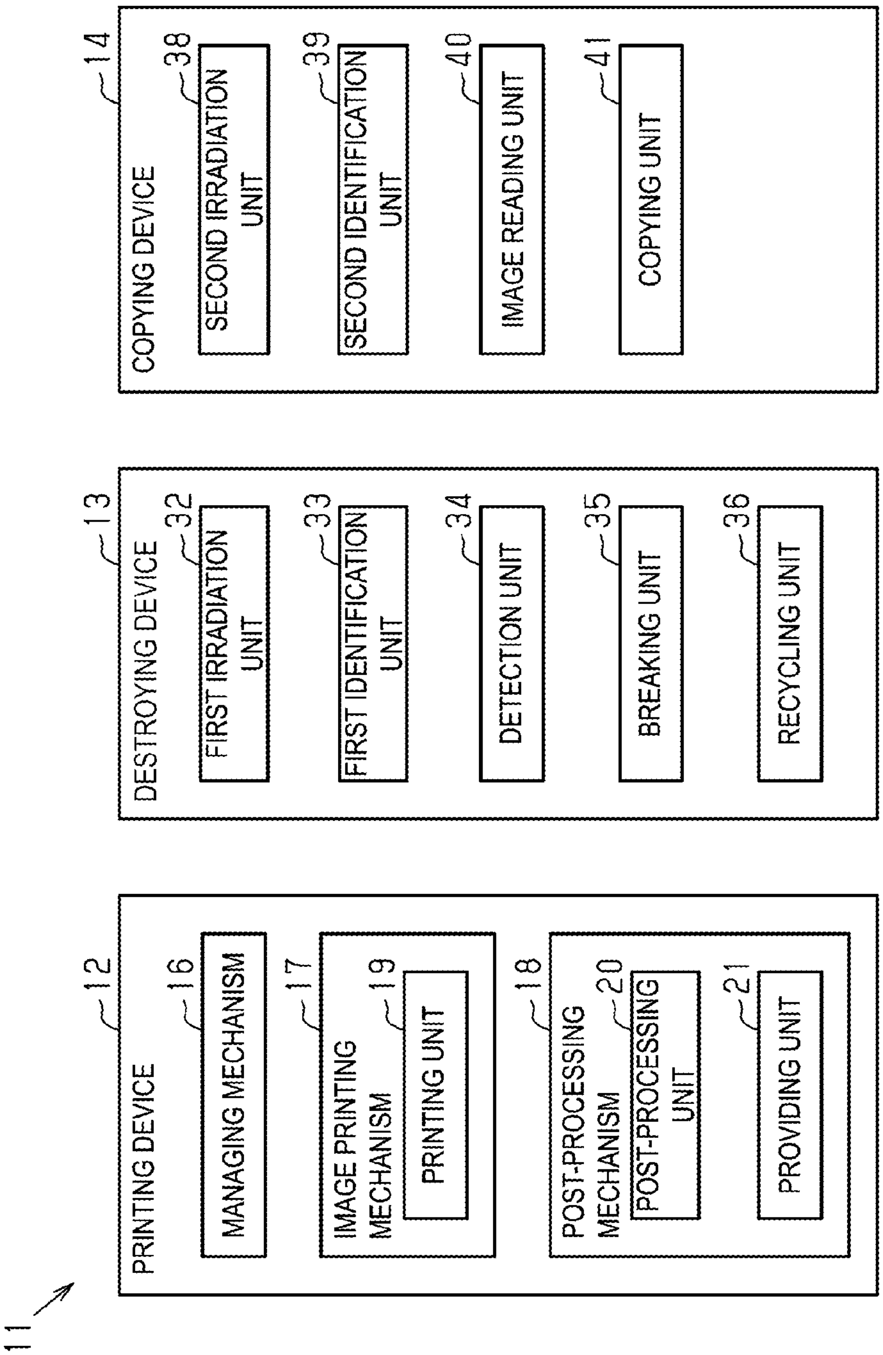
FIG. 3 is a block diagram illustrating a printed material management system according to a second embodiment.

As illustrated in FIG. 3, the printed material management system 11 differs from the first embodiment in that the copying device 14 does not include the restricting unit 42. Since the second embodiment is substantially the same as the first embodiment in the other respects, the same configurations are denoted with the same reference symbols and redundant description is omitted.

The copying device 14 may copy the printed material 22 provided with the identifier 30.

Figure 4:
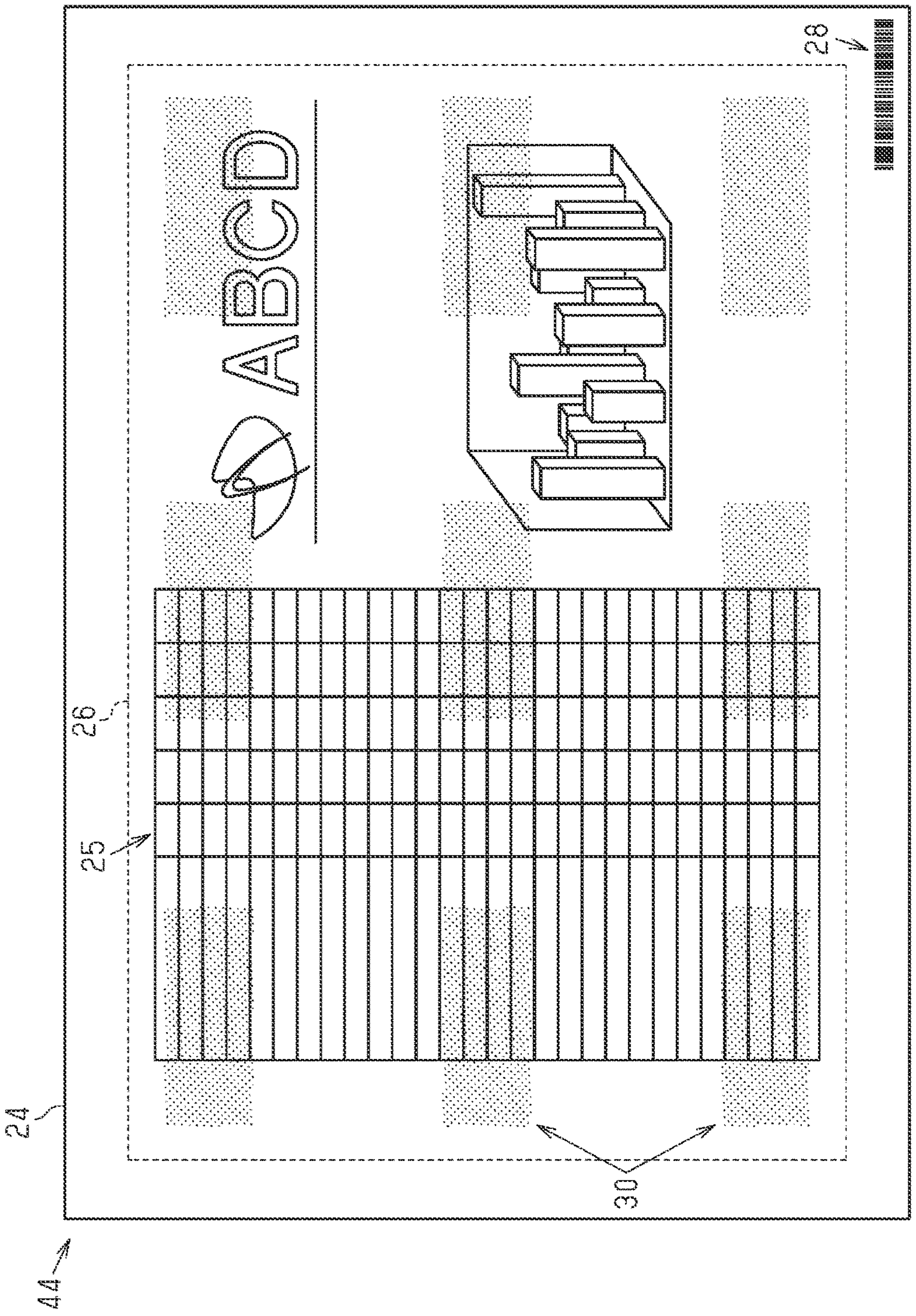
FIG. 4 is a schematic diagram illustrating a copied material produced in the second embodiment.

As illustrated in FIGS. 3 and 4, the copying unit 41 may print the image 25 and the identifier 30 with visible ink.

The copying unit 41 may print the visible reference symbol 28 with visible ink. Specifically, the copying unit 41 may print, on a different sheet 24 than the original printed material 22, the visible reference symbol 28 and the image 25 read by the image reading unit 40 and the identifier 30 read by the second identification unit 39.

The image 25, the visible reference symbol 28, and the identifier 30 printed with visible ink are visually recognizable under normal light. When the original identifier 30 is provided on the image 25, the copying unit 41 may print the image 25 and the identifier 30 in an overlapping manner, or may perform the printing such that a portion of the image 25 overlapping the identifier 30 is deleted.

The copying unit 41 may perform the printing with visible ink after performing the printing with visible ink. The copying unit 41 may print, on the copied material 44, the identifier 30 for managing the copied material 44 with invisible ink. Specifically, the copying unit 41 may provide the identifier 30 that is invisible under normal light separately from the identifier 30 that is visually recognizable under normal light. The identifier 30 printed with invisible ink is visually recognizable under special light and invisible under normal light. In the following description, the identifier 30 that is visually recognizable under normal light is referred to also as visible identifier, and the identifier 30 that is invisible under normal light is also referred to as invisible identifier.

The copying unit 41 may print the invisible identifier at the same position as the visible identifier. Specifically, the copying unit 41 may print the invisible identifier on the visible identifier. The copying unit 41 may print the invisible identifier at a position different from that of the visible identifier.

Operations of Second Embodiment

Operations of this embodiment are described below.

The managing mechanism 16 may manage the copied material 44 and the printed material 22 provided with the invisible identifier. The copying device 14 may send information about the copied material 44 provided with the invisible identifier to the managing mechanism 16. The managing mechanism 16 may exclude from management the copied material 44 and the printed material 22 discarded by the destroying device 13. The managing mechanism 16 may manage the printed material 22 and the copied material 44 from the time they are produced until they are discarded.

Effects of Second Embodiment

Effects of this embodiment are described below.

(10) The copying unit 41 produces the copied material 44 by printing the identifier 30 and the image 25 of the printed material 22 with visible ink. Thus, the original printed material 22 and the copied material 44 that has been copied can be distinguished.

(11) The copying unit 41 prints the identifier 30 for managing the copied material 44 with invisible ink on the copied material 44. Thus, the copied material 44 can be managed by the first irradiation unit 32, the second irradiation unit 38, the first identification unit 33, and the second identification unit 39 as in the management of the printed material 22.

Third Embodiment

Next, a printing device and a printed material management system of a third embodiment are described with reference to the drawings. The third embodiment is different from the second embodiment in the method of producing the copied material 44. Since the configuration of the printed material management system 11 is the same as that of the second embodiment, the same configurations are denoted with the same reference symbols and redundant description is omitted.

Figure 5:
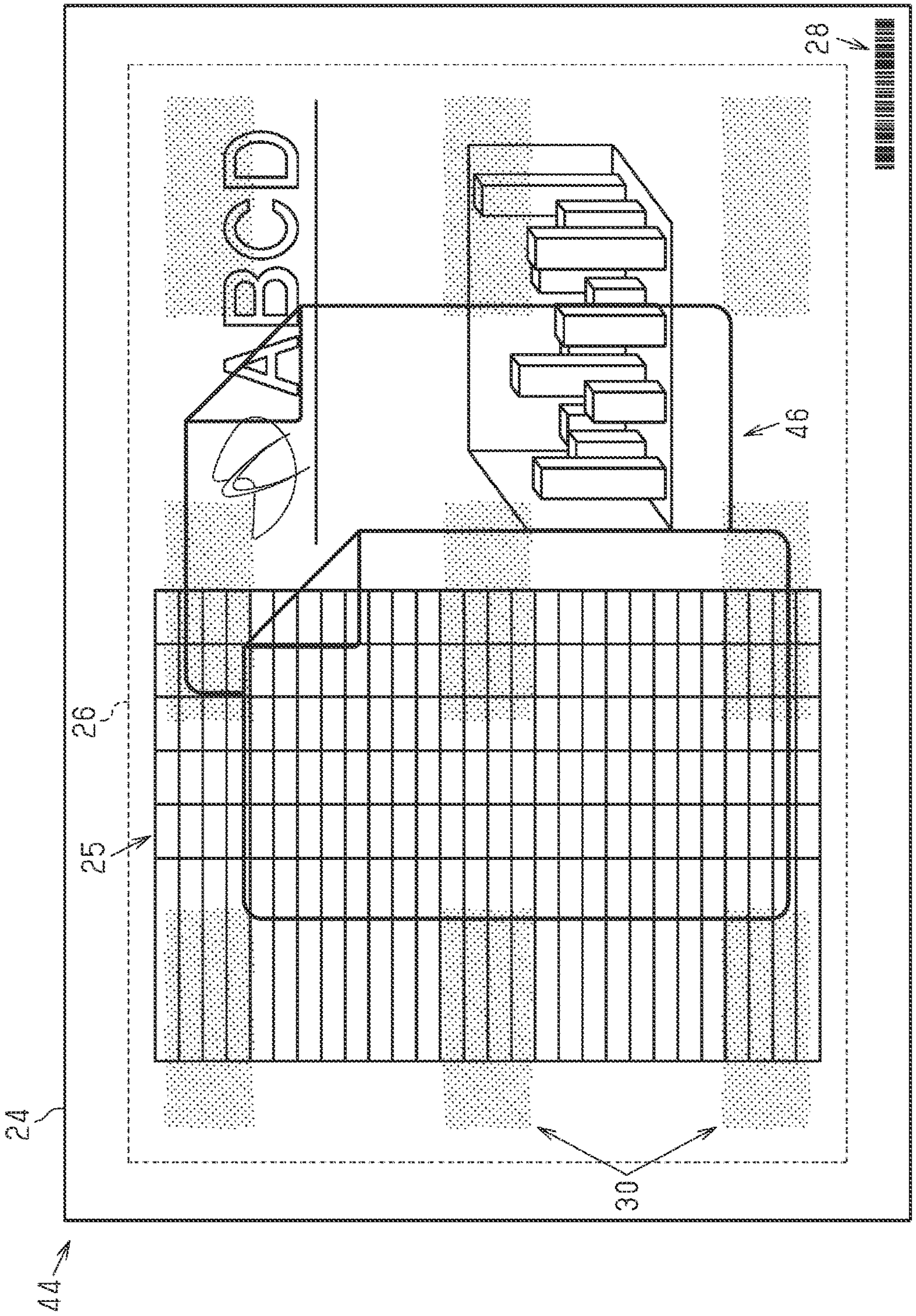
FIG. 5 is a schematic diagram illustrating a copied material produced in a third embodiment.

As illustrated in FIGS. 3 and 5, the copying unit 41 may produce the copied material 44 by printing the image 25 and symbol 46 with visible ink. The copying unit 41 may print the visible reference symbol 28 with visible ink. Specifically, the copying unit 41 may print, on a different sheet 24 than the original printed material 22, the visible reference symbol 28 and the image 25 read by the image reading unit 40, and a symbol 46 that indicates that the material is the copied material 44. The symbol 46 may be an icon, a mark, a character, or a mark.

The image 25, the visible reference symbol 28, and the symbol 46 printed with visible ink are visually recognizable under normal light. The symbol 46 may be printed in an overlapping manner on the image 25 or may be printed in a margin.

The copying unit 41 may perform the printing with visible ink after performing the printing with visible ink. The copying unit 41 may print, on the copied material 44, the identifier 30 for managing the copied material 44 with invisible ink. That is, the identifier 30 is an invisible identifier.

Operations of Third Embodiment

Operations of this embodiment are described below.

The managing mechanism 16 may manage the printed material 22 and the copied material 44 as in the second embodiment.

Effects of Third Embodiment

Effects of this embodiment are described below.

(12) The copying unit 41 prints, with visible ink, the image 25 of the printed material 22 on which the identifier 30 is printed, together with the symbol 46 that indicates that the material is the copied material 44. Thus, the original printed material 22 and the copied material 44 that has been copied can be distinguished.

Modifications

The embodiments may be implemented with the following modifications. The embodiments and the following modifications may be implemented in combination with each other to the extent that they are technically consistent.

First Modification

The detection unit 34 may detect a deficiency of the printed material 22 based on the number of the identifiers 30 read by the first identification unit 33. The destroying device 13 may acquire the number of the identifier 30 provided to the printed material 22 from the managing mechanism 16, for example. The detection unit 34 may detect a deficiency of the printed material 22 when the number of the identifiers 30 read by the first identification unit 33 is smaller than the number of the identifiers 30 provided at the time of production. The detection unit 34 may detect a deficiency of the copied material 44 as in the detection of a deficiency of the printed material 22.

According to this first modification, the detection unit 34 detects a deficiency based on the number of the identifiers 30 provided to the printed material 22. Thus, a deficiency of the printed material 22 can be easily detected by utilizing the result of reading of the identifier 30 by the first identification unit 33.

Second Modification

Figure 6:
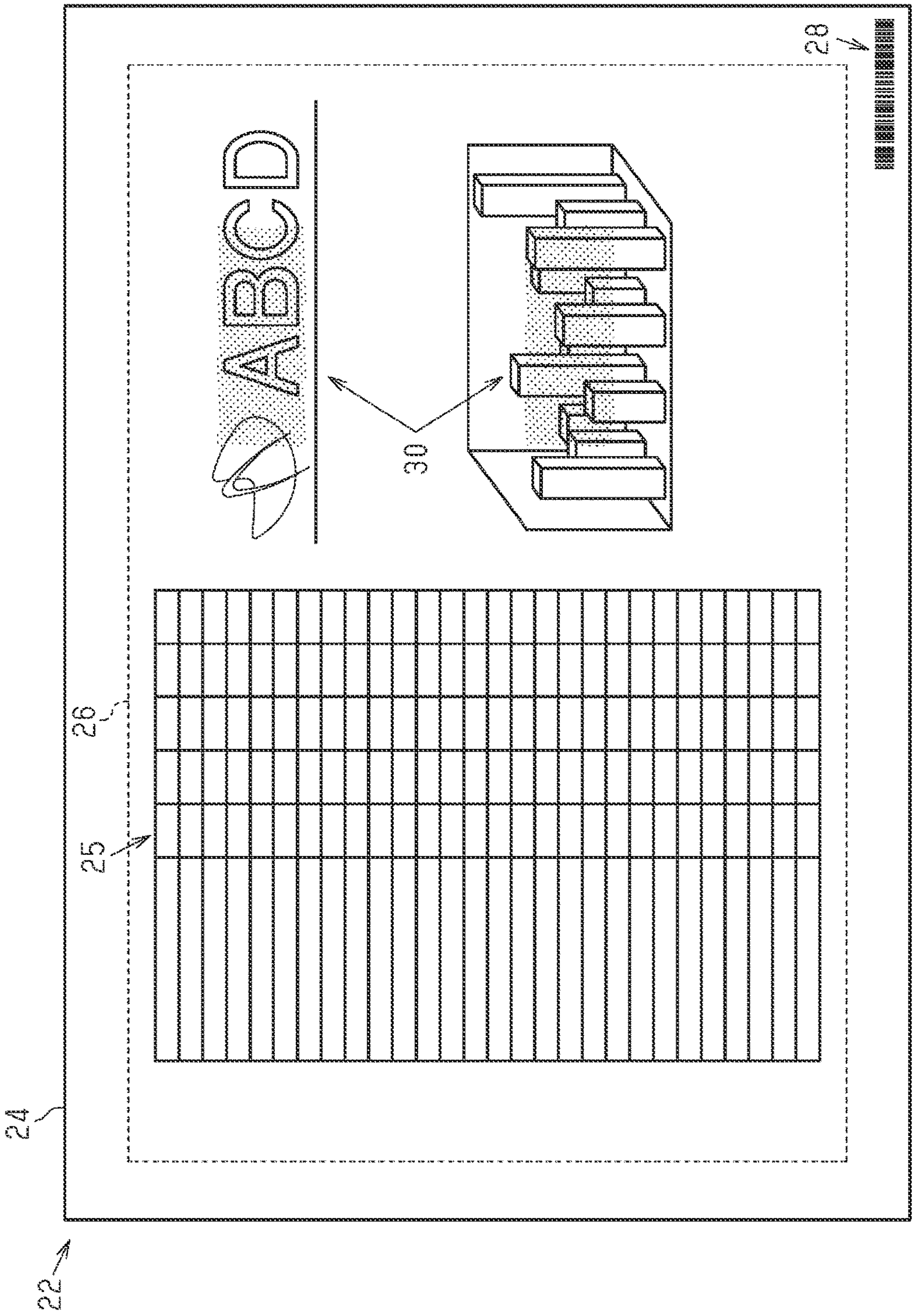
FIG. 6 is a schematic diagram illustrating a printed material produced in a second modification.

As illustrated in FIG. 6, the position where the identifier 30 is provided may be discretionally changed. For example, the identifier 30 may be provided in a highly confidential portion. The number and size of the identifiers 30 may be discretionally changed. The number of the identifier 30 provided to the printed material 22 or the copied material 44 may be one.

Other Modifications

The printing device 12 may include no managing mechanism 16. The managing mechanism 16 may be provided separately from the printing device 12, and the printed material management system 11 may include no managing mechanism 16. The printed material 22 and the copied material 44 may be managed by visually recognizing the identifier 30 to which special light is applied by a person.

The providing unit 21 may print with invisible ink a contour line along the edge of the printed material 22. Specifically, the contour line is visually recognizable under special light and invisible under normal light. The contour line may include a straight line, a wavy line, or a zigzag line. The detection unit 34 may detect a deficiency of the printed material 22 when the contour line is interrupted. The contour line may be printed to surround a highly confidential portion. The detection unit 34 may detect whether there is a deficiency in the highly confidential portion.

The entire surface of the sheet 24 may be the printing region 26. The printing unit 19 and the copied material 44 may be produced by frameless printing. The printed material 22 and the copied material 44 may have no margin. The printing unit 19 and the copying unit 41 may print the visible reference symbol 28 in the printing region 26. In this case, the printing unit 19 and the copying unit 41 may print the visible reference symbol 28 at a position not overlapping the image 25.

The providing unit 21 and the copying unit 41 may provide the identifier 30 in a margin outside the printing region 26. The providing unit 21 and the copying unit 41 may provide the identifier 30 across the inside of the printing region 26 and the margin.

The providing unit 21 may provide the information about the printed material 22 to the printed material 22. The providing unit 21 may encode the information about the printed material 22 and provide the encoded information to the printed material 22. The providing unit 21 may provide the identifier 30 including the information about the printed material 22 to the printed material 22. Examples of the information about the printed material 22 include the shape of the printed material 22, the size of the printed material 22, the number of the identifiers 30 provided, the date of production of the printed material 22, the person who produced the printed material 22, and the deadline of discarding.

The copying unit 41 may provide information about the copied material 44 to the copied material 44. The copying unit 41 may encode the information about the copied material 44 and provide the encoded information to the copied material 44. The copying unit 41 may provide the identifier 30 including the information about the copied material 44 to the copied material 44. Examples of the information about the copied material 44 include the shape of the copied material 44, the size of the copied material 44, the number of the identifiers 30 provided, the date of production of the copied material 44, the person who produced the copied material 44, and the deadline of discarding.

The managing mechanism 16 may make a notification to the administrator when the deadline of discarding of the printed material 22 and the copied material 44 is near.

The invisible ink may be a luminescent ink that absorbs an ultraviolet ray, which is an example of special light, and emits light. The identifier 30 printed with the luminescent ink is transparent under visible light. The identifier 30 printed with the luminescent ink becomes visually recognizable when absorbing an ultraviolet ray and converting it into visible light. When the identifier 30 is provided using the luminescent ink, the ultraviolet ray is special light and the visible light is normal light.

When the printed material 22 is not provided with the identifier 30 in the second embodiment and third embodiment, the copying device 14 need not provide the identifier 30 using visible ink.

When the printed material 22 is not provided with the identifier 30 in the third embodiment, the copying device 14 need not print the symbol 46 on the copied material 44.

The printing unit 19 need not print the visible reference symbol 28 on the printed material 22. The copying unit 41 need not print the visible reference symbol 28 on the copied material 44 even when there is the visible reference symbol 28 on the original printed material 22.

The destroying device 13 may be a shredder capable of crushing the printed material 22 and the copied material 44. The breaking unit 35 may cut the printed material 22 into pieces with which the image 25 cannot be recognized.

The image printing mechanism 17 may include the providing unit 21. The providing unit 21 may provide the identifier 30 to the printed material 22 on which the image 25 has been printed. The providing unit 21 may produce the printed material 22 provided with the identifier 30 by providing the identifier 30 in advance before the image 25 is printed.

The providing unit 21 may be provided separately from the image printing mechanism 17 and the post-processing mechanism 18.

The copying unit 41 need not perform the printing with visible ink.

The copying device 14 may include, separately from the copying unit 41, the post-processing mechanism 18 including the providing unit 21 and the post-processing unit 20.

The copying device 14 may be a scanner. The copying unit 41 may store data such as the image 25 read from the printed material 22 in storage medium. Specifically, the copying device 14 may copy the printed material 22 in the form of data.

The visible ink may be discretionally selected from any inks that can achieve printing by adhering to the sheet 24. For example, the visible ink includes inks in which particles of functional materials consisting of solids such as pigments and metal particles are dissolved, dispersed, or mixed in a solvent, and the visible ink encompasses various compositions such as water-based inks, oil inks, gel inks, and hot melt inks.

The printing device 12 and the copying device 14 may perform printing on any media without being limited to the sheet 24. The printing device 12 and the copying device 14 may perform printing on media such as resin, metal, cloth, ceramic, rubber, and wood, for example. The shape of the media may be any shapes such as rectangular shapes and circular shapes.

Definitions

The expression "at least one" as used herein means "one or more" of the desired options. As an example, the phrase "at least one" as used herein means "only one option" or "both of the two options" when the number of options is two. As another example, the expression "at least one" as used herein means "only one option" or "any combination of two or more options" when the number of options is three or more.

Supplementary Note

The following is a description of the technical concept and its effects that can be grasped from the above-mentioned embodiments and modified examples.

(A) A printing device includes a providing unit configured to provide to a printed material an identifier for managing the printed material. The providing unit prints the identifier with invisible ink on the printed material, and the identifier is visually recognizable under special light and invisible under normal light.

With this configuration, the identifier is provided to the printed material with the invisible ink. The identifier is visually recognizable under special light and invisible under normal light. Thus, degradation in appearance of the printed material due to the identifier can be reduced.

(B) In the printing device, the providing unit may provide a plurality of the identifiers to the printed material.

With this configuration, the providing unit may provide the plurality of identifiers to the printed material. Thus, even when the printed material is torn and some identifiers become unidentifiable, the printed material can be identified with other identifiers, for example.

(C) A printed material management system may include the above-described printing device, and a destroying device. The destroying device may include an irradiation unit configured to emit the special light, an identification unit configured to read the identifier irradiated with the special light from the irradiation unit, a detection unit configured to detect a deficiency of the printed material, and a breaking unit configured to break down the printed material.

With this configuration, the discarding device can identify the printed material with the irradiation unit emitting special light to the printed material and the identification unit reading the identifier provided to the printed material. The destroying device includes the detection unit configured to detect the deficiency of the printed material. Thus, the printed material management system can manage whether the printed material is thoroughly discarded.

With this configuration, the discarding device can identify the printed material with the irradiation unit emitting special light to the printed material and the identification unit reading the identifier provided to the printed material. The discarding device includes the detection unit configured to detect the deficiency of the printed material. Thus, the printed material management system can manage whether the printed material is thoroughly discarded.

(D) In the printed material management system, the detection unit may detect the deficiency of the printed material based on a shape of an end of the printed material.

With this configuration, the detection unit detects the deficiency based on the shape of the printed material, and thus can detect the deficiency even when the deficiency is small.

(E) In the printed material management system, the providing unit may provide a plurality of the identifiers to the printed material, and the detection unit may detect the deficiency of the printed material based on the number of the identifiers read by the identification unit.

With this configuration, the detection unit detects the deficiency based on the number of the identifiers provided to the printed material. Thus, the detection unit can easily detect the deficiency of the printed material by utilizing the result of reading of the identifiers by the identification unit.

(F) A printed material management system may include the above-described printing device, and a copying device. The copying device may include an irradiation unit configured to emit the special light, an identification unit configured to read the identifier irradiated with the special light from the irradiation unit, an image reading unit configured to read an image of the printed material, a copying unit configured to produce a copied material, and a restricting unit configured to restrict reading of the image or production of the copied material. The restricting unit may restrict the reading of the image or the production of the copied material for the printed material provided with the identifier.

With this configuration, the copying device can identify the printed material, with the irradiation unit emitting the special light to the printed material and the identification unit reading the identifier provided to the printed material. The restricting unit restricts the reading of the image or the production of the copied materials for the printed material provided with the identifier. That is, the printed material provided with the identifier is not duplicated, and thus the printed material management system can easily manage the printed material.

(G) A printed material management system may include the above-described printing device, and a copying device. The copying device may include an irradiation unit configured to emit the special light, an identification unit configured to read the identifier irradiated with the special light from the irradiation unit, an image reading unit configured to read an image of the printed material, and a copying unit configured to produce a copied material. The copying unit may print the image and the identifier with visible ink, and the image and the identifier printed by the copying unit may be visually recognizable under normal light.

With this configuration, the copying unit produces the copied material by printing the image and the identifier of the printed material with visible ink. Thus, the original printed material and the copied material that has been copied can be distinguished.

(H) A printed material management system may include the above-described printing device, and a copying device. The copying device may include an irradiation unit configured to emit the special light, an identification unit configured to read the identifier irradiated with the special light from the irradiation unit, an image reading unit configured to read an image of the printed material, and a copying unit configured to produce a copied material. The copying unit may print with visible ink the image of the printed material provided with the identifier and a symbol indicating that the material is the copied material to produce the copied material including the image and the symbol that are visually recognizable under normal light.

With this configuration, the copying unit prints with the visible ink the image of the printed material on which the identifier is printed together with the symbol that indicates that the material is the copied material. Thus, the original printed material and the copied material that has been copied can be distinguished.

(I) In the printed material management system, the copying unit may print an identifier for managing the copied material with invisible ink on the copied material.

With this configuration, the copying unit prints the identifier for managing the copied material with invisible ink on the copied material. Thus, the copied material can be managed by the irradiation unit and the identification unit as in the management of the printed material.

(J) In the printed material management system, the printing device may include an image printing mechanism including a printing unit configured to produce the printed material, and a post-processing mechanism including a post-processing unit configured to perform a post-processing on the printed material. The post-processing mechanism may include the providing unit.

If the identifier is printed before the image, the identifier may possibly be hidden by the image. In view of this point, in this configuration, the providing unit is provided in the post-processing mechanism. The post-processing mechanism performs the post-processing on the printed material produced by the image printing mechanism. Thus, the providing unit can print the identifier on the printed material on which the printing has been performed.

(K) In the printed material management system, the destroying device may include a recycling unit configured to recycle, into a sheet, the printed material broken.

With this configuration, the destroying device causes the recycling unit to recycle, into a sheet, the printed material broken down by the breaking unit. Thus, the resources can be effectively utilized.

(L) In the printed material management system, the printing unit may print with visible ink an image and a visible reference symbol that are visually recognizable under normal light, and the visible reference symbol may include information about the printed material.

With this configuration, in addition to the transparent identifier, the visible reference symbol is printed with the visible ink on the printed material. Specifically, information is provided to the printed material in such a manner that the transparent identifier and the visible reference symbol that is visually recognizable are separately provided. Thus, the information to be kept secret from a person and the information to be recognized by a person can be separately provided to the printed material.

What is claimed is:

1. A printed material management system comprising:

a providing unit configured to provide to a printed material an identifier that includes an information about the printed material and that differs for each printed material, wherein the providing unit prints the identifier with invisible ink on the printed material and the identifier is visually recognizable under special light and invisible under normal light; and a destroying device, wherein the destroying device includes:

an irradiation unit configured to emit the special light, an identification unit configured to read the identifier irradiated with the special light from the irradiation unit, a detection unit configured to detect a deficiency of the printed material, and a breaking unit configured to break down the printed material.

2. The printed material management system according to claim 1, wherein the detection unit detects the deficiency of the printed material based on a shape of an end of the printed material.

3. The printed material management system according to claim 1, wherein the providing unit provides a plurality of the identifiers to the printed material and the detection unit detects the deficiency of the printed material based on the number of the identifiers read by the identification unit.

4. The printed material management system according to claim 1, wherein the printing device includes:

an image printing mechanism including a printing unit configured to produce the printed material and a post-processing mechanism including a post-processing unit configured to perform a post-processing on the printed material and the post-processing mechanism includes the providing unit.

5. The printed material management system according to claim 4, wherein the printing unit prints with visible ink an image and a visible reference symbol that are visually recognizable under normal light and the visible reference symbol includes information about the printed material.

6. The printed material management system according to claim 1, wherein the destroying device includes a recycling unit configured to recycle, into a sheet, the printed material broken.

7. A printed material management system comprising:

a providing unit configured to provide to a printed material an identifier that includes an information about the printed material and that differs for each printed material, wherein the providing unit the identifier with invisible ink on the printed material and the identifier is visually recognizable under special light and invisible under normal light; and a copying device, wherein the copying device includes:

an irradiation unit configured to emit the special light, an identification unit configured to read the identifier irradiated with the special light from the irradiation unit, an image reading unit configured to read an image of the printed material, a copying unit configured to produce a copied material, and a restricting unit configured to restrict reading of the image or production of the copied material and the restricting unit restricts the reading of the image or the production of the copied material for the printed material provided with the identifier.

8. A printed material management system comprising:

a providing unit configured to provide to a printed material an identifier that includes an information about the printed material and that differs for each printed material, wherein the providing unit the identifier with invisible ink on the printed material and the identifier is visually recognizable under special light and invisible under normal light; and a copying device, wherein the copying device includes:

an irradiation unit configured to emit the special light, an identification unit configured to read the identifier irradiated with the special light from the irradiation unit, an image reading unit configured to read an image of the printed material, and a copying unit configured to produce a copied material, the copying unit prints the image and the identifier with visible ink, and the image and the identifier printed by the copying unit are visually recognizable under normal light.

9. The printed material management system according to claim 8, wherein the copying unit prints an identifier for managing the copied material with invisible ink on the copied material.

10. A printed material management system comprising:

a providing unit configured to provide to a printed material an identifier that includes an information about the printed material and that differs for each printed material, wherein the providing unit the identifier with invisible ink on the printed material and the identifier is visually recognizable under special light and invisible under normal light; and a copying device, wherein the copying device includes:

an irradiation unit configured to emit the special light, an identification unit configured to read the identifier irradiated with the special light from the irradiation unit, an image reading unit configured to read an image of the printed material, and a copying unit configured to produce a copied material and the copying unit prints with visible ink the image of the printed material provided with the identifier and a symbol indicating that a medium including the symbol is the copied material to produce the copied material including the image and the symbol that are visually recognizable under normal light.

* * * * *